Aug. 18, 1953   J. H. OSGOOD   2,648,912
CONTOUR INSPECTION DEVICE
Filed Aug. 11, 1947   10 Sheets-Sheet 3
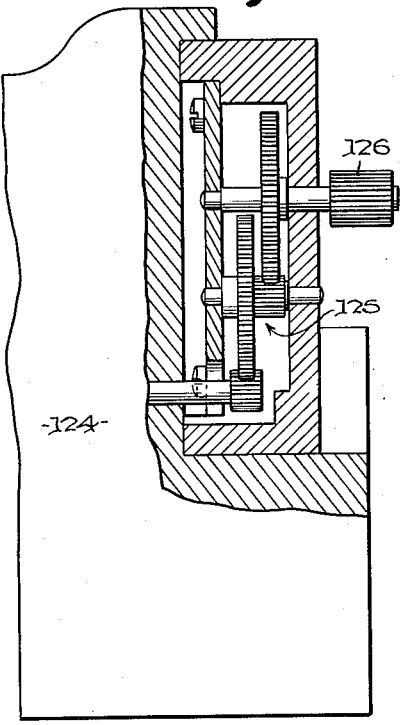
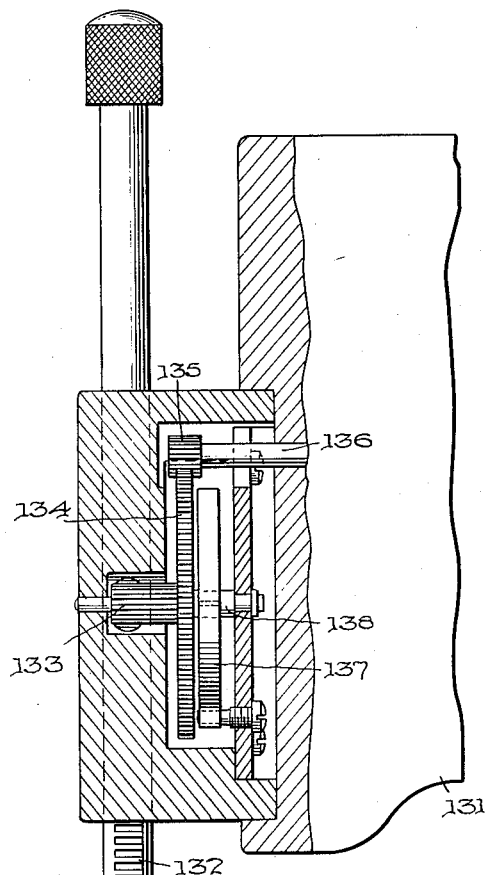
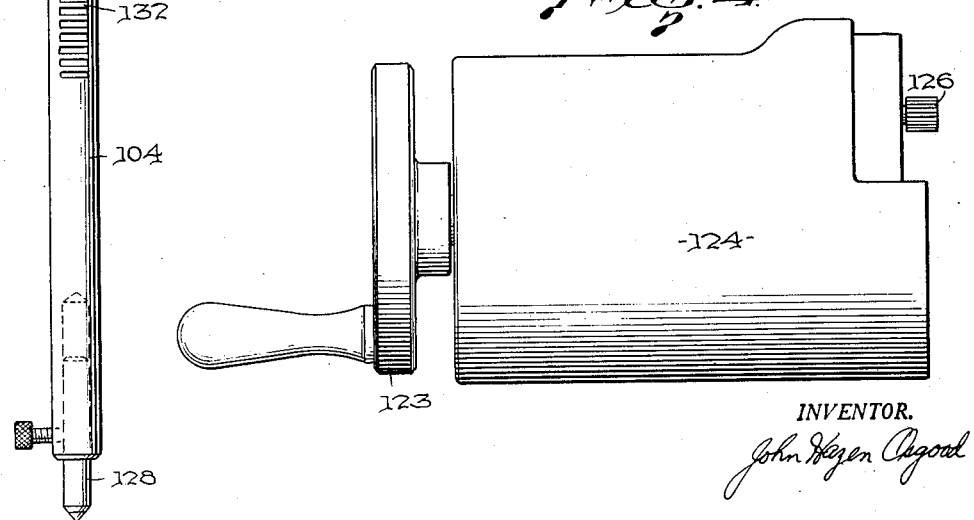
INVENTOR.
John Hezen Osgood

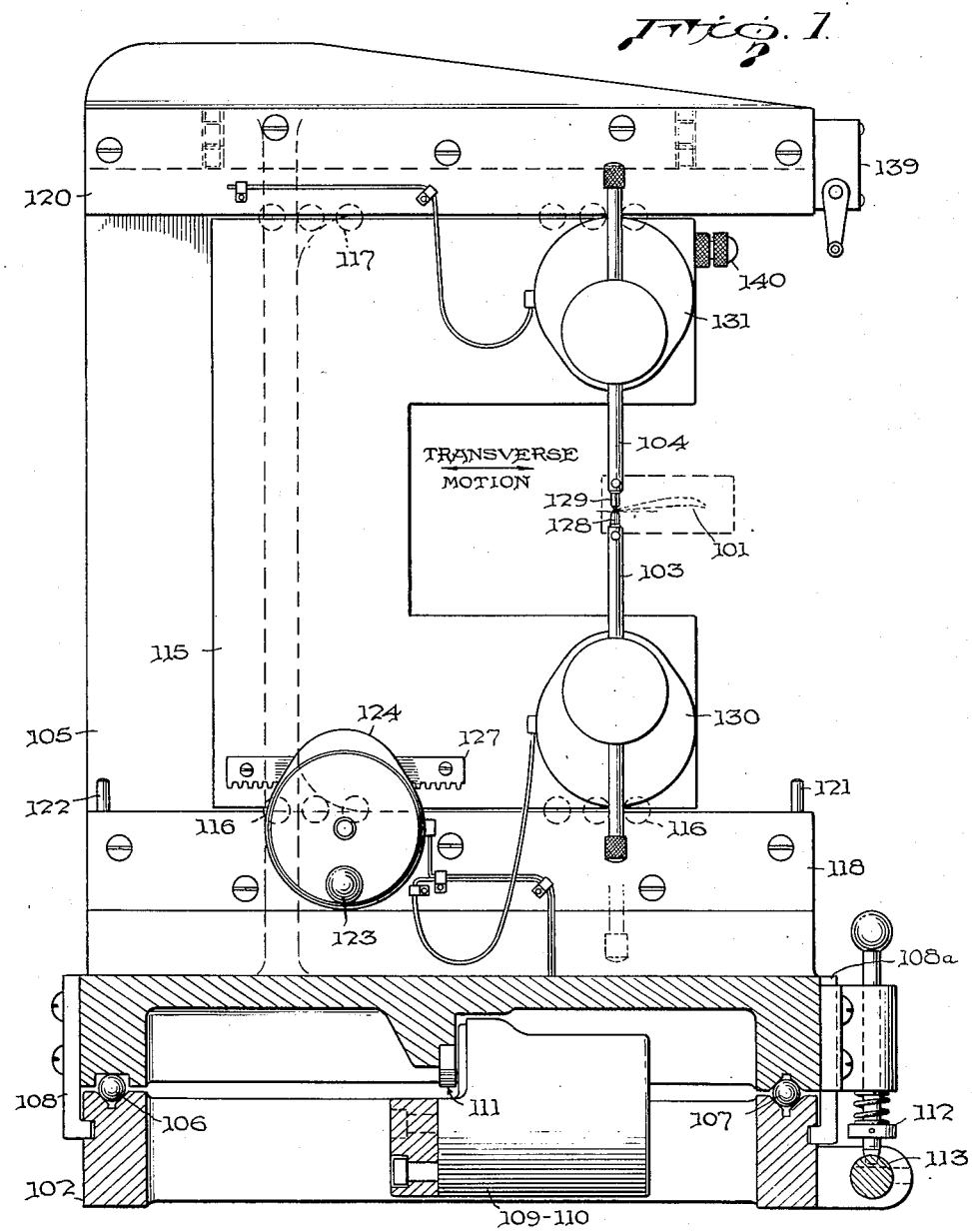

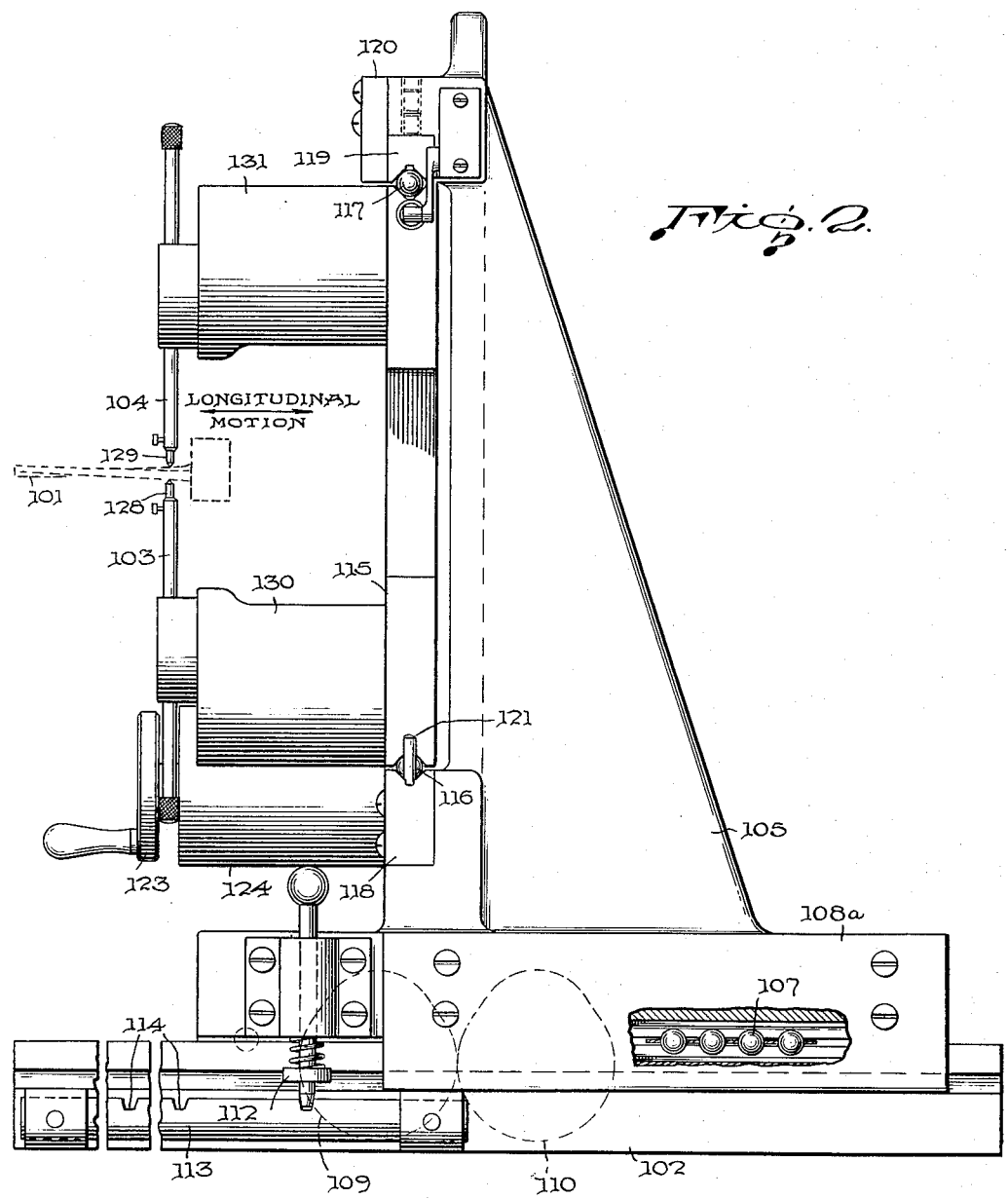

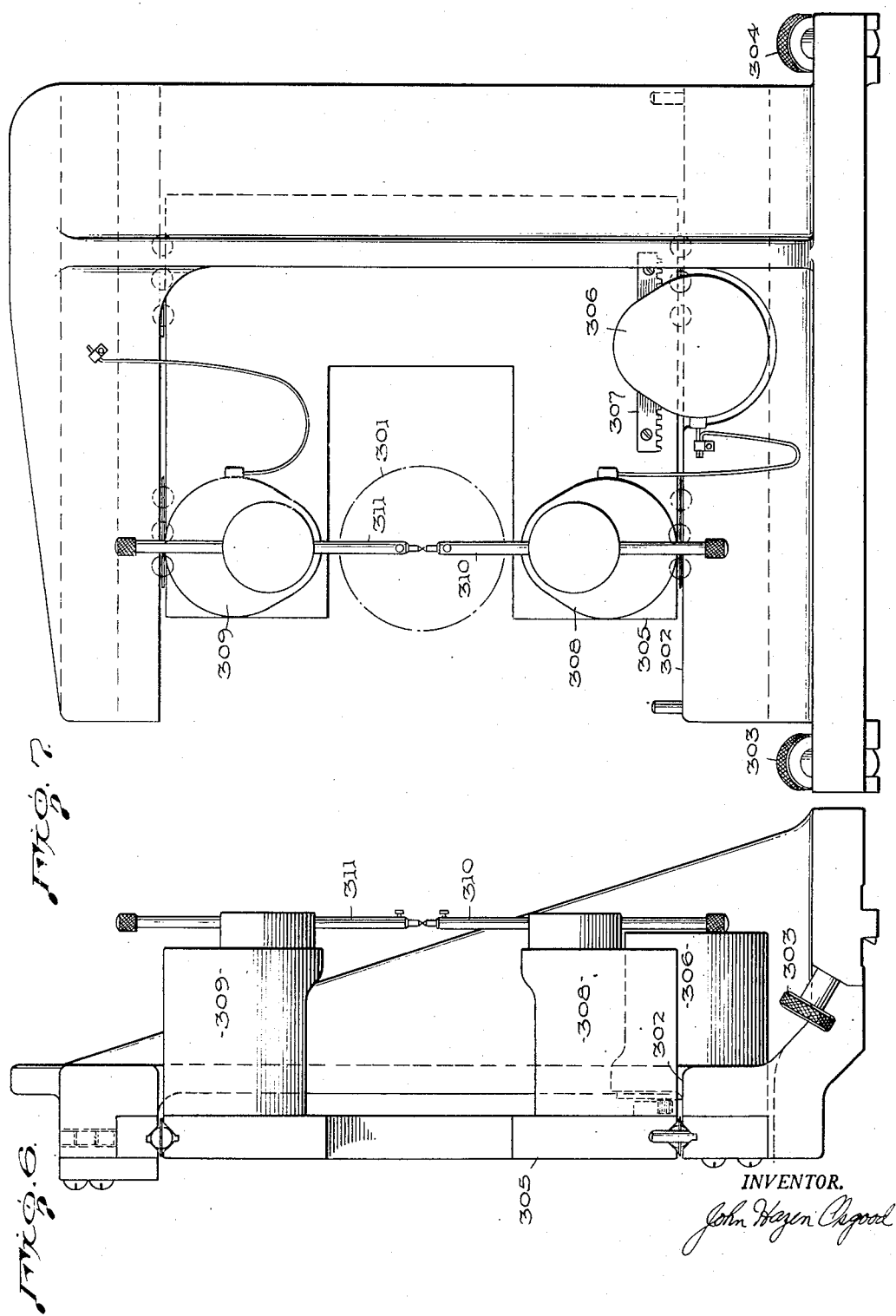

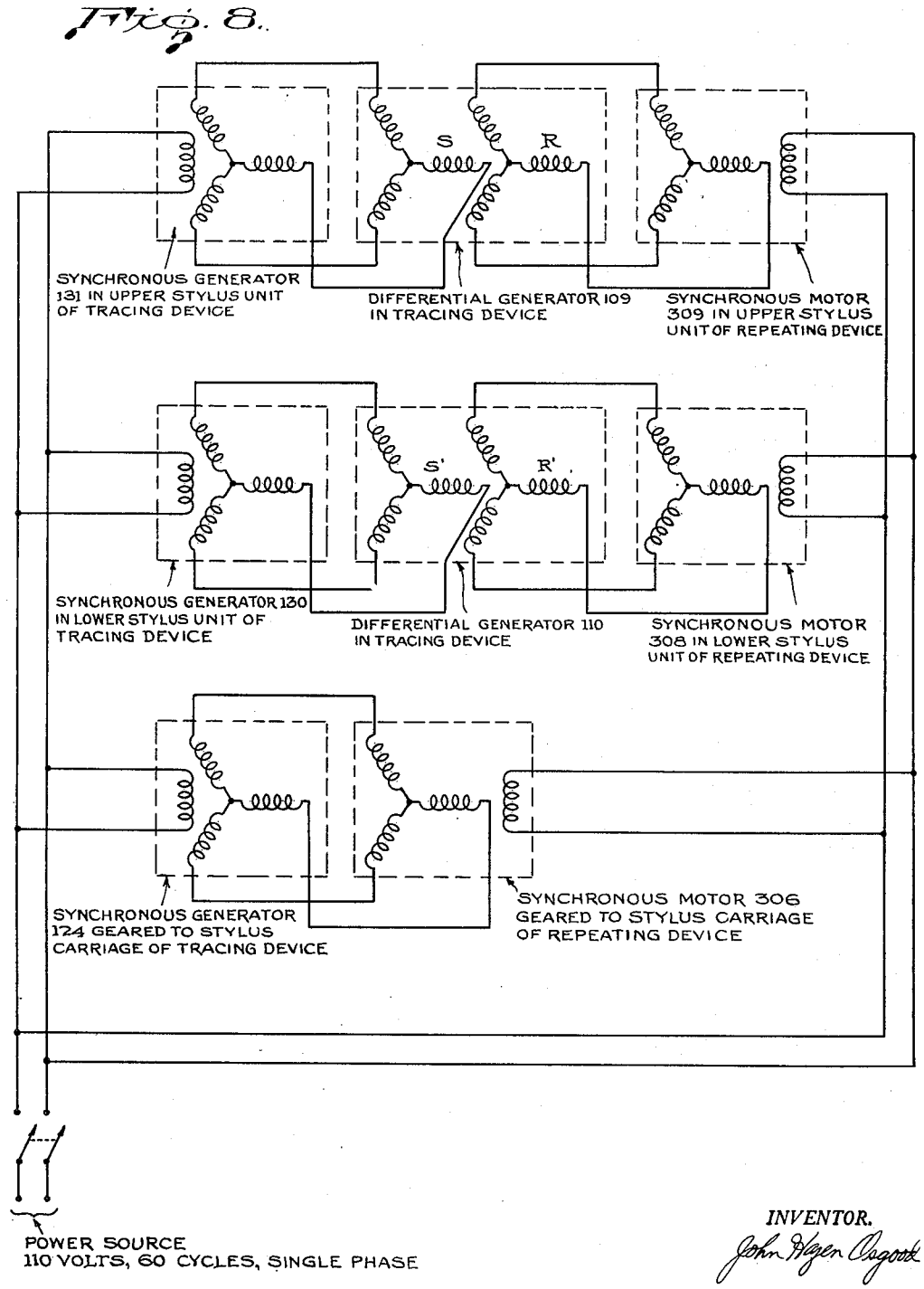

Aug. 18, 1953     J. H. OSGOOD     2,648,912
CONTOUR INSPECTION DEVICE
Filed Aug. 11, 1947     10 Sheets-Sheet 6
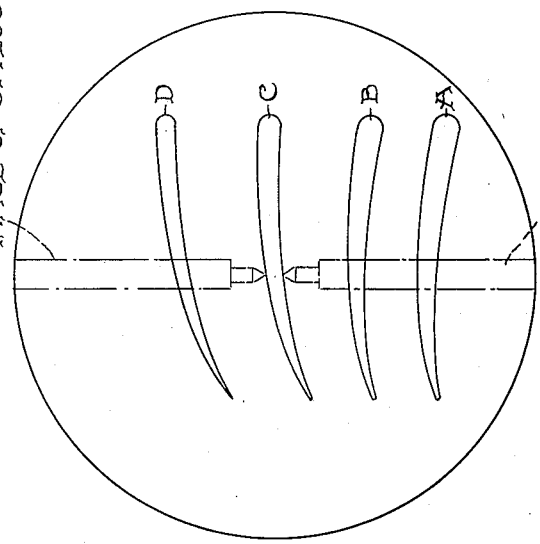
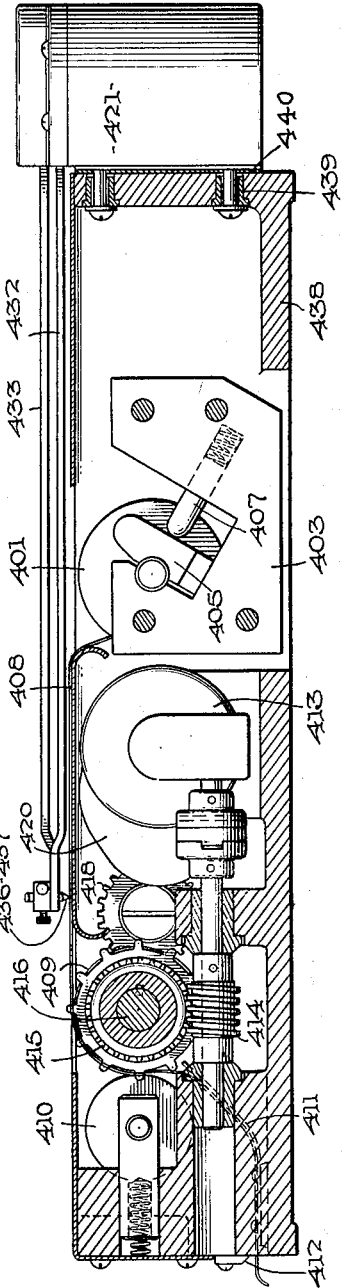
INVENTOR.
John Hazen Osgood

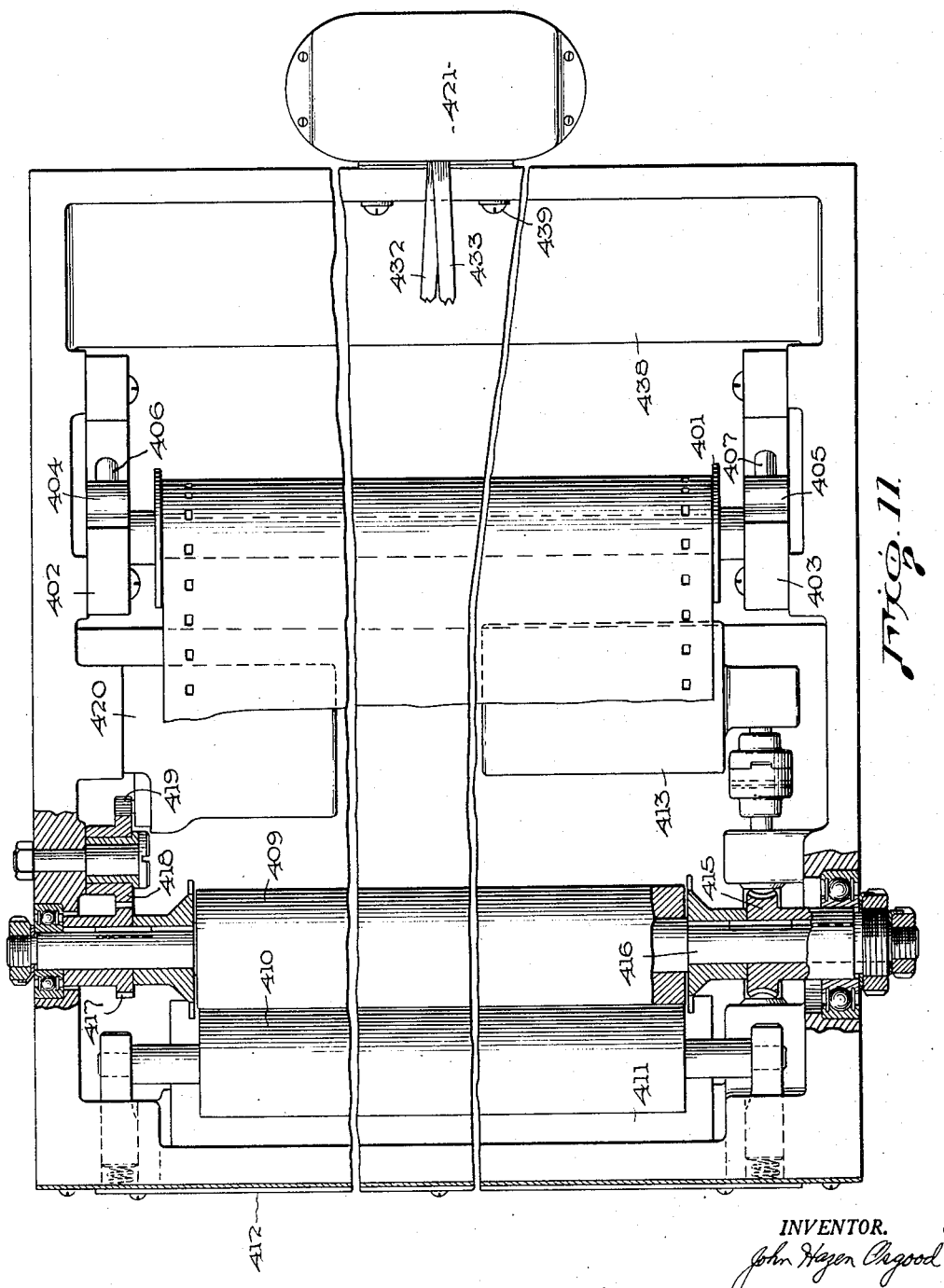

Aug. 18, 1953  J. H. OSGOOD  2,648,912
CONTOUR INSPECTION DEVICE
Filed Aug. 11, 1947  10 Sheets-Sheet 8
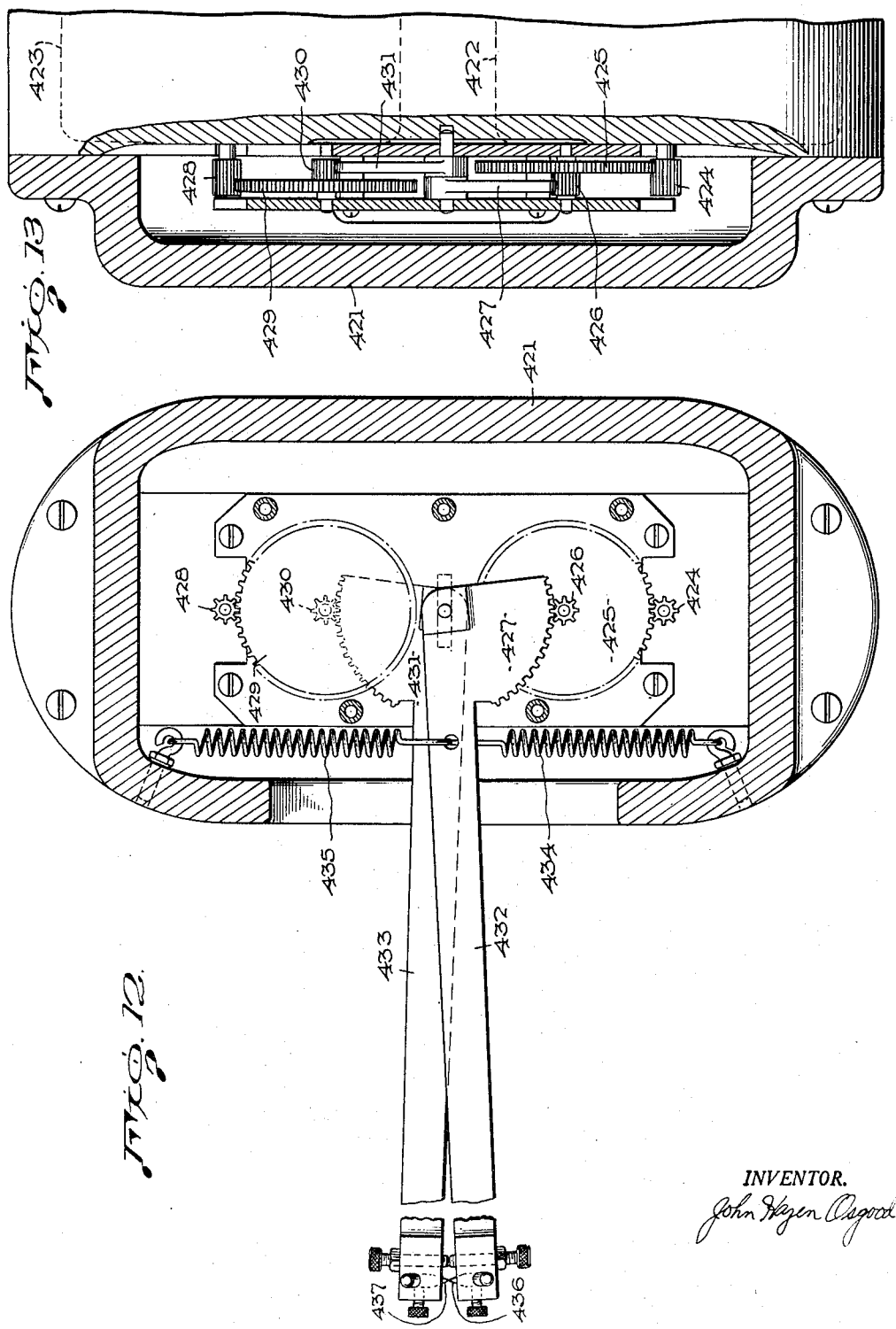
INVENTOR.
John Hazen Osgood

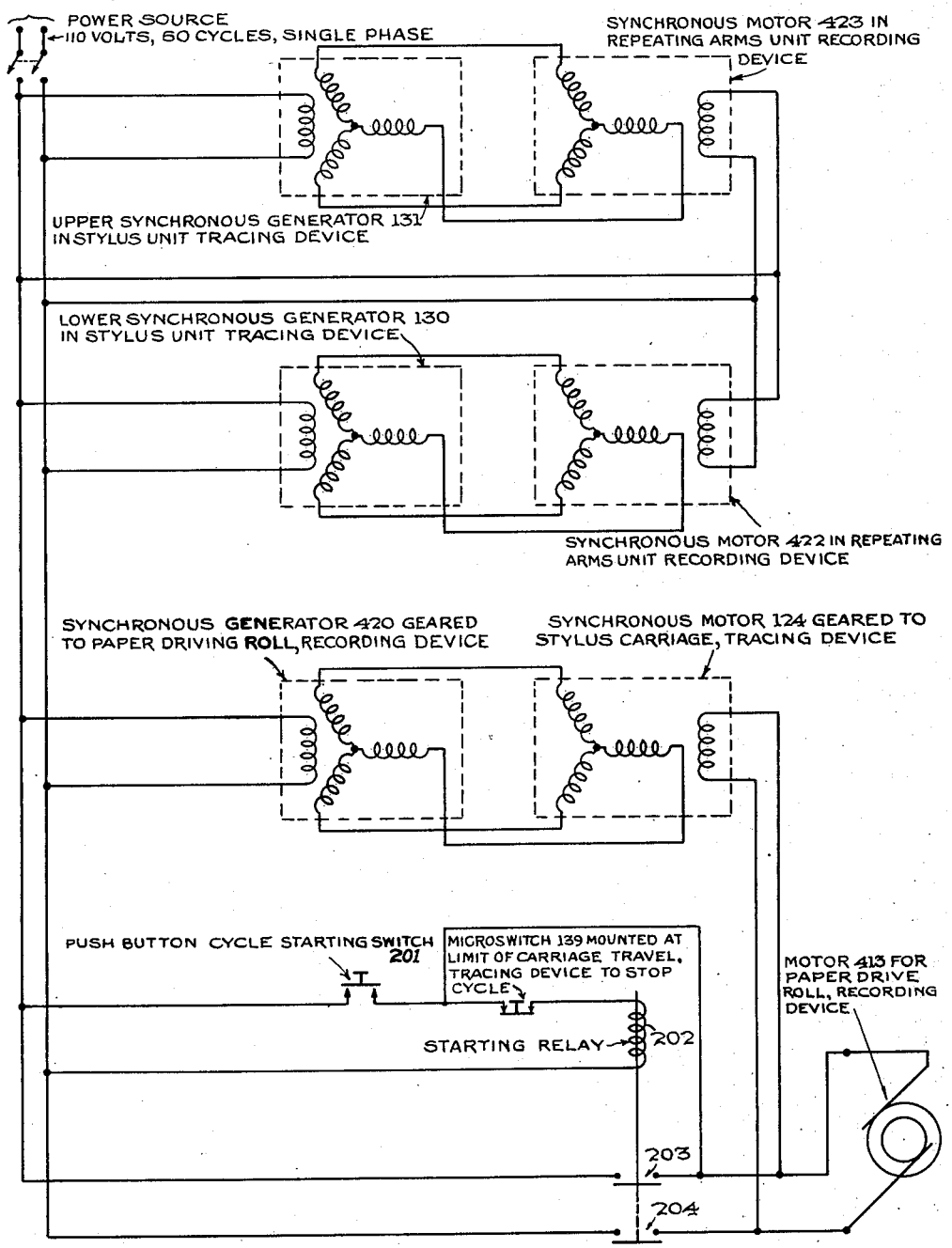

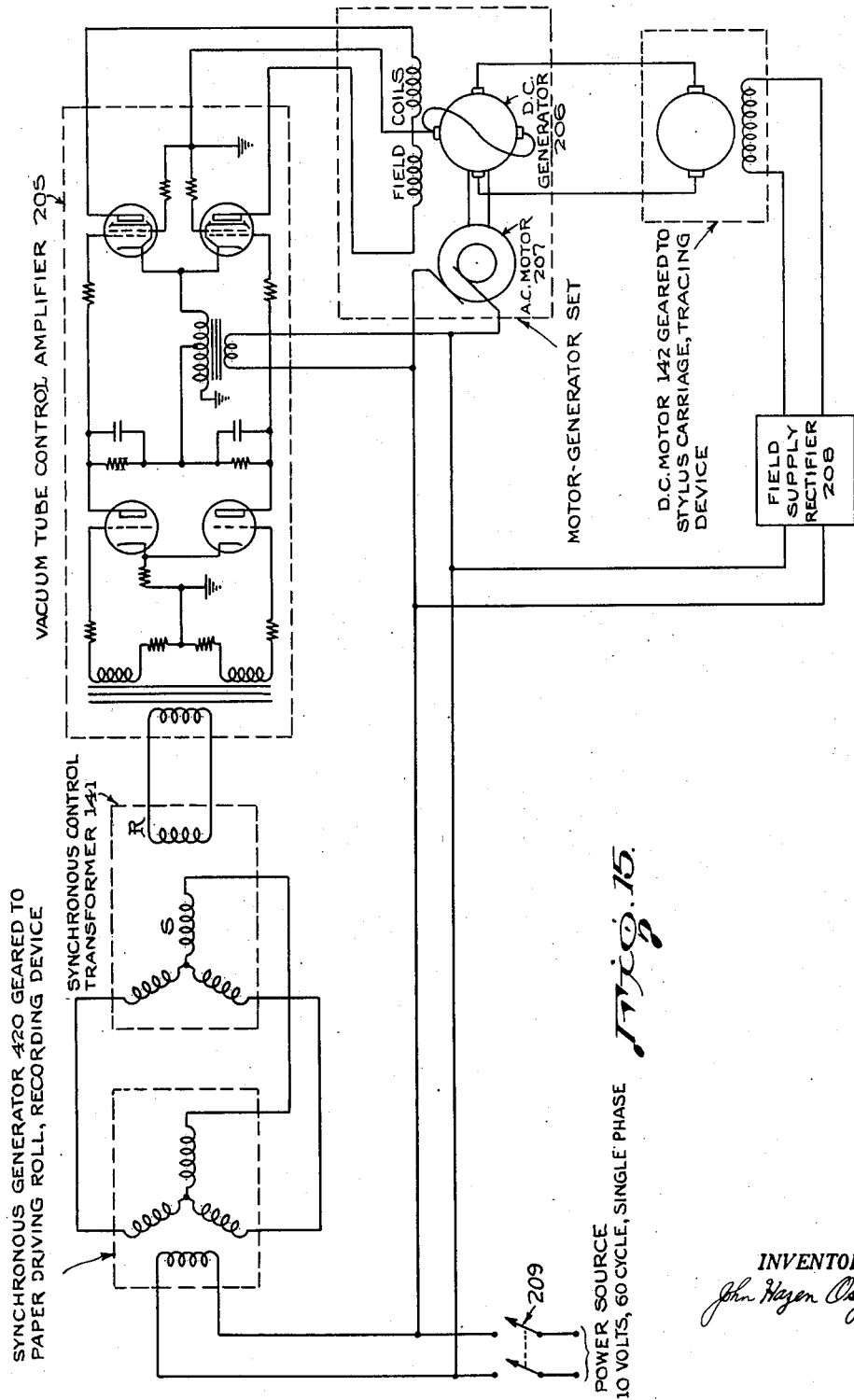

Patented Aug. 18, 1953

2,648,912

UNITED STATES PATENT OFFICE 2,648,912

CONTOUR INSPECTION DEVICE

John Hazen Osgood, Claremont, N. H.

Application August 11, 1947, Serial No. 768,039

13 Claims. (Cl. 33—174)

This invention relates to a contour inspection device which may be used for the inspection of objects as to form and dimension, and more particularly to a device which facilitates the inspection of objects defined by complex curved surfaces such as turbine blades, propeller blades, and the like.

The rapid advances made of recent years in the turbine field have been accompanied by an ever increasing need for accurate and more efficient means and methods of inspection to meet the requirements for the mass production of turbine blades and buckets. However, the inspection of these and similar objects presents many difficulties not encountered when inspecting objects having flat and simple curved surfaces characteristic of ordinary machine elements. This is especially true of objects assuming a complex form manifested by variations in both pitch and cross-sectional area, and further, by the presence of both concave and convex surfaces. That common forms of inspection devices cannot be used for this type of inspection it is apparent, and in general those which have been devised for the purpose, such as special types of manually operated gauges and indicators, are of such a complex nature as to require operation by an experienced and skilled person, even then consuming an excessive amount of time.

A device which has been used most effectively for the routine inspection of simple objects is the well known optical comparator. Briefly, it comprises a system of optical comparison, the image of the object to be inspected being compared against a standard drawing or outline of the object on a translucent screen. A source of light behind the object casts a shadow or image of the object which is then subjected to suitable magnification in an optical system and reflected upon the screen to be compared against the standard. While the results obtainable with optical comparators are commendable, it is difficult to foresee how, at the present state of the comparator art, such a device may be used without modification to inspect the complex objects as have been referred to hereinabove. Another limitation of the usual comparator, as well as many other inspection devices, is that a permanent record of the inspection results is not made. Such a record is often desirable.

Accordingly, this invention has as a purpose the provision of a device which may be used with an optical comparator to adapt it for the routine inspection as to form, dimensions, and angular relationships, of objects defined by complex curved surfaces. A further purpose is to provide a device for the inspection of complex curved surfaces which will permanently record the inspection results, and which will present a record from which the form, dimensions, and angular relationships may be determined. A still further purpose is to provide an inspection device of the nature described which may be operated by an unskilled person with a minimum of instruction. These and other purposes appearing hereinafter are accomplished by the present invention, an understanding of which may be had by reference to the accompanying drawings and the descriptive matter relating thereto. In the drawings, Fig. 1 is a front view, partly in section, of a tracing unit embodying the principles of the present invention.

Fig. 2 is a side view, partly in section, of the tracing unit of Fig. 1.

Fig. 3 is a view, partly in section, illustrating a preferred method of gearing synchronous generator 124.

Fig. 4 is a complete side view of synchronous generator 124.

Fig. 5 is a view, partly in section, showing a tracing stylus 104 and its manner of attachment to synchronous generator 131.

Fig. 6 is a side view of a repeating unit used in one embodiment of the present invention.

Fig. 7 is a rear view of the repeating unit shown in Fig. 6.

Fig. 8 is a schematic diagram of an electrical system for connecting the tracing and repeating units of the preceding figures.

Fig. 9 is a representation of an optical comparator screen showing the manner of comparing the repeating styli images against standard sections on the screen.

Fig. 10 is a side view of a recorder used in another embodiment of the invention.

Fig. 11 is a plan view of the recorder shown in Fig. 10.

Fig. 12 is a plan view of the recorder repeating arm gear housing unit 421, partly in section.

Fig. 13 is an end view, partly in section, of the gearing arrangement shown in Fig. 12.

Fig. 14 is a schematic diagram of an electrical system for connecting the tracing and recording units.

Fig. 15 is an alternate electrical system which may be used to obtain power amplification to drive the stylus carriage of the tracing unit instead of the direct synchronous generator-motor connections of Fig. 14.

Briefly stated, the inspection device contemplated by the present invention comprises a pair of styli mounted in a tracing unit and movable in three rectangular coordinates, so that the styli may traverse any point of an object to be inspected, electrical means comprising a synchro or selsyn system to transmit intelligence resulting from the various motions of the styli, and a repeating or exhibiting unit where the motions are reproduced, permitting observation of the form, dimensions, and angular relationships of the object under inspection.

In one form of the invention the repeating unit is adapted to be used in conjunction with an optical comparator so that an object may be inspected, the image of which ordinarily cannot be projected onto a comparator screen because of interference with the light path by the warped and complex surfaces of the object. This particular embodiment will be considered first. For convenience, the reference numerals to the tracing unit are in the 100 series, to any intermediate electrical system, the 200 series, and to the repeating unit, the 300 series.

Referring to Figs. 1 and 2 which show two views of the tracing unit, the object to be inspected, 101, is fixed in relation to the base 102 of the tracing unit by means of a suitable fixture not shown. The tracing of object 101 is accomplished by styli 103 and 104 which are designed to move in the vertical plane as they traverse any point of the object. Motion of the styli in the longitudinal direction of object 101, that is, in the direction as indicated by Fig. 2, is accomplished through frame 105 which is mounted on base 102 by suitable means such as balls 106 and 107 and gib plates 108 and 108a.

Frame 105 is shown as one casting extending from the base 102 to the top of the tracing unit. This motion is transmitted to the repeating unit of Figs. 6 and 7, in part by means of differential synchronous electric generators 109 and 110 mounted in the base 102 and geared to a rack at 111 mounted in frame 105. A stop mechanism 112 attached to frame 105, and stop bar 113 are provided to limit the motion of frame 105, and thus facilitate the inspection of the object 101 in several predetermined parallel planes, depending upon the number and spacing of the notches 114 in bar 113.

Motion of the styli in the transverse direction of object 101, that is, in the direction as indicated by Fig. 1, and in a direction 90 degrees from the motion of the frame 105, is accomplished by carriage 115 which is mounted in frame 105 by means of balls 116 and 117, ways 118 and 119, and plate 120. Way 118 is provided with stops 121 and 122 to limit the motion of the carriage at the extremities of its travel. The motion of carriage 115 in turn is accomplished by the rotation of crank 123 which is geared through the armature shaft of synchronous electric generator 124 by means of gear train 125 and pinion 126 (shown in Figs. 3 and 4) to rack 127 mounted on the carriage 115. Generator 124 transmits the motion of the carriage to the repeating unit shown in Figs. 6 and 7. The two styli 103 and 104 are provided with replaceable tips 128 and 129 of suitable shape and size, such as spherical with a radius of say about 1/64 inch, and are geared to two synchronous electric generators 130 and 131 which are mounted in fixed positions on carriage 115. These generators transmit the motions of the styli in the vertical plane to the repeating unit. A convenient manner of gearing the styli is shown in Fig. 5. For example, stylus 104 is racked with teeth 132 to permit engagement with pinion 133, which by means of gear 134 and pinion 135 causes rotation of generator shaft 136 when the stylus is moved in the vertical plane. A spring 137, of a type similar to a watch main spring, is mounted on shaft 138 to maintain a positive pressure on the stylus at all times. This keeps the stylus in constant contact with the object under inspection, and eliminates the worst condition of backlash which would tend to effect the system, since the pressure of the pinion teeth on the rack teeth of the stylus is always in the same direction. By choosing a suitable gear ratio, say 8 to 1, between the gear 134 and generator pinion 135, any backlash at this point may be reduced so that it is no longer serious.

The repeating unit shown in Figs. 6 and 7 is similar in many respects to the tracing unit. However, it is designed to be positioned such that the repeating styli 310 and 311 are within the effective lens aperture 301 of an optical comparator, and the frame 302 is therefore provided with clamps 303 and 304 so that the entire unit may be so positioned. Carriage 305 may be mounted in frame 302 in the same manner as the tracing carriage was shown to be mounted in its unit, and its motion is accomplished by synchronous electric motor 306 which is geared to rack 307 on the carriage. The motor 306 is electrically connected to synchronous generator 124 of the tracing unit and is energized by impulses received as a result of the rotation of the armature in generator 124. On the carriage 305 two more synchronous electric motors 308 and 309 are mounted. To these are geared the two repeater styli, 310 and 311 respectively. The same type of mechanism as was used for gearing the tracing styli 103 and 104 to synchronous generators 130 and 131 of the tracing unit may be used to gear the repeater styli 310 and 311 to the synchronous electric motors 308 and 309. The motors 308 and 309 are connected electrically to generators 130 and 131 respectively, so that the motions of the tracing styli are repeated in space by the repeating styli 310 and 311.

An electrical system for the connection of the tracing and repeating units heretofore described is shown in Fig. 8. Referring to this, the preceding figures, and Fig. 9, the mode of operation is as follows.

The object 101 to be inspected is properly fixed in relation to the base 102 of the tracing unit. The first plane of inspection may be at a section close to the hub of the object, say in the plane of the styli as shown in Fig. 2. The frame 105 is shown fixed in that plane of inspection, so there would be no need to disturb it. The carriage 115 is then moved in transverse relation to object 101 by means of crank 123, causing the styli to engage the object and move in accordance with its contours. This causes the rotors of stylus synchronous generators 130 and 131 to revolve, creating electrical impulses therein. These impulses are transmitted by transformer action through the stators and rotors of differential generators 109 and 110 to the rotors of synchronous motors 308 and 309 in the repeating unit. The result is a rotation of the motor rotors in the repeating unit in accordance with the rotation of the respective generator rotors in the tracing unit. Since the rotors of the differential generators do not move at any time during this or any other tracing operation, the effect is the same as if the synchronous generator rotors in the tracing unit had been connected directly to the synchronous motor rotors in the repeating unit. Such a connection is actually used to effect movement of the repeating unit carriage 305; as crank 123 is operated to move carriage 115, it also rotates the rotor of synchronous generator 124, and consequently, the rotor of synchronous motor 306, geared to the repeating unit stylus carriage, moves in step. Thus, the motions undergone by the tracing styli are duplicated in space by the repeating styli of the repeating unit. The latter, being within the effective lens aperture of an optical comparator, permits of the formation of their respective images by a light source on one side and the magnification and projection onto a comparator screen of these images by the comparator optical system on the other side of the styli. The screen, having been provided with one or more large cross-sectional outlines of object 101 corresponding to the plane or planes inspected, facilitates a comparison of the paths travelled by the repeating styli images against a standard. A comparator screen with several sections drawn thereon is illustrated by Fig. 9, showing the manner in which the styli images may appear on the screen. The first plane of inspection, such as the one near the hub of object 101 described above, may correspond to section A on the screen. Since the images will move in accordance with the actual contours of the object under inspection, any deviations from the standard sections may be noted.

Upon completion of the inspection in one plane, such as that one referred to above, a second plane of inspection may be selected at any predetermined point of the object. The frame 105 of the tracing unit is then moved by lifting stop mechanism 112 and manually sliding the unit on its base to the point where the styli reside in the desired plane. The stop mechanism is then released to engage the notch in stop bar 113 corresponding to the plane to be inspected, and fixing the frame 105 in that plane. This movement will effect the rotation of rotors R and R' with respect to the stators S and S' (shown in Fig. 8) of the differential generators 109 and 110 located in the base 102 of the tracing unit. Such motion will cause the rotors of synchronous motors 308 and 309 of the repeating unit to experience the same degree of rotation, this rotation being in the same direction, since the differential generator rotors move in the same direction. The net result is a unidirectional vertical movement of the repeating styli, say upwards. Because the motion is fixed and controllable, the standard of comparison may be positioned on the comparator screen above and at the proper distance from the cross-sectional outline required for the first plane of inspection. Movement of frame 105 of the tracing unit to a predetermined section of the object will then automatically position the images of the styli to the corresponding standard section on the comparator screen, such as from the first plane of inspection, A, shown in Fig. 9 to that plane corresponding to section B shown immediately above A. The operator may then place the tracing styli in position on the object, and by manipulating crank 123, inspect this next section in the same manner as has been described for the first, following which sections C and D may similarly be inspected.

It is recalled that the differential generator rotors remain in a fixed position during each tracing operation so that the repeating styli will move in step with the tracing styli. Conversely, when the rotors of the differential generators are moved, the tracing styli synchronous generator rotors remain substantially fixed, so that the repeating styli will move in step with the rotors of the differential generators. The effect of any movement of the tracing styli while the rotors of the differential generators are moved will be automatically corrected when the operator sets the tracing styli in place for a trace. However, means may be provided for locking the tracing styli during this operation if desired.

The reason for incorporating the differential generators in the tracing unit is to speed the operation of the entire inspection device by permitting the inspection of a number of sections of an object without changing the comparator screen. Where this convenience is not imperative, the differential generators may be eliminated, and direct connections made between the tracing styli generators and the repeating styli motors, although this would necessitate a comparator screen change for each section inspected.

Another form of the invention embodies the use of a recording unit instead of the optical comparator repeating unit, so that a continuous record of the inspection results may be obtained. For this purpose the same tracing unit of Figs. 1 and 2 may be used, although with some modification. The differential generators 109 and 110 are no longer necessary and need not be used, but the frame 105 is movable as before and may be locked in place by the stop and bar mechanism at any desired plane of inspection. Synchronous generator 124, instead of being used as a synchronous generator, is a synchronous motor and is operated from the recorder, although the mechanical means for moving carriage 115, namely crank 123 and its associated mechanism, remains unchanged. The frame 105 is provided with a microswitch 139 which is operated by adjustable stop 140 on the carriage 115 to automatically limit the operation and motion of carriage 115 after a trace. Stylus synchronous generators 130 and 131 function as described hereinabove.

The recording unit is shown in Figs. 10 and 11. A roll of paper 401 is mounted in holders 402 and 403 by means of clamps 404 and 405 held in place by spring actuated members 406 and 407. The paper is fed over a plate 408 and then over a driving roll 409 which is provided with teeth or sprockets at the ends thereof to engage with perforations on the sides of the paper, thus achieving a positive drive of the paper. Another roll, 410, presses against the driving roll, being under spring pressure, and maintains close contact between the paper and the driving roll. From the driving roll the paper passes over a curved plate 411, which guides it out to the end of the recording unit where a blade 412 is provided to facilitate tearing off the record after it has been made. The driving roll 409 is actuated by a constant speed electric motor 413 driving through a coupling and worm gear 414 to gear 415 on the driving roll shaft 416. The other side of the driving roll shaft is geared through gears 417 and 418 to pinion 419 of a synchronous electric generator 420. This generator is electrically connected to synchronous motor 124 of the tracing unit to effect motion of the tracing carriage 115 when the recorder is operated. The housing 421, shown in detail in Figs. 12 and 13, contains two synchronous electric motors 422 and 423 which are operated by impulses received from synchronous generators 130 and 131 of the tracing unit. Each synchronous motor is geared through a suitable gear train, such as pinion 424, gear 425, pinion 426 and gear 427 for one, and pinion 428, gear 429, pinion 430, and gear 431 for the other, to repeating arms 432 and 433 respectively. These arms swing in an arc, and are lightly loaded by means of springs 434 and 435 to maintain unidirectional pressure of the gear teeth at all times, and further to provide a return for the arms. The actual recording on the paper is accomplished by points 436 and 437 which contain a writing compound, or, an electric potential may be utilized between the points and plate 408 to register impressions on an electro-sensitive paper. The latter procedure presents little difficulty since housing 421 is electrically insulated from the main recorder frame 438 by insulating bushings such as at 439 and an insulating plate 440. The circuit may be from a source of electrical potential through the housing 421, arms 432 and 433, points 436 and 437, plate 408, main frame 438, and back to the source.

Fig. 14 shows the electrical connections between the tracing and recording units. Referring to this and to Figs. 1, 2, 10 and 11, the mode of operation is as follows:

The object 101 to be inspected is placed in a fixed position with respect to the base 102 of the tracing unit. Using the stop mechanism 112 and stop bar 113, the frame is fixed in any desired plane of inspection. The stylus carriage 115 is then manually moved by crank 123 to a position where the styli are adjacent to the object 101, in readiness to start the trace. The pushbutton cycle starting switch 201 is pushed, thereby causing starting relay 202 to close, and a holding contact 203 on the relay keeps the relay energized and closed, once the cycle has been started. At the same time, another contact 204 of the relay completes the circuit of recorder motor 413, putting the recorder paper in motion. This energizes synchronous generator 420 geared to the paper driving roll, and the impulses from this generator are transmitted to synchronous motor 124 of the tracing unit causing the tracing carriage 115 to traverse the object 101. As soon as the carriage moves over the objects, styli 103 and 104 energize synchronous generators 130 and 131 of the tracing unit. These impulses in turn are transmitted to synchronous motors 422 and 423 of the recorder, causing recorder arms 432 and 433 to describe the contours of the object under inspection upon the recorder paper. The motions of the arms will be in proportion to the motions of the styli 103 and 104 multiplied by a factor of amplification, this factor being a function of the physical proportions of the arms and their gear trains. For optimum results, the distance the recorder paper travels should be in proportion to the distance the carriage 115 of the tracing unit travels, multiplied by the same factor of amplification as that of the arms. This factor, however, arises from the physical proportions of the gearing between the driving roll 409 and the synchronous generator 420. The combined effect of the motions of the arms and of the paper will cause the form of the object 101 to be drawn on the paper, and the outline so inscribed will be enlarged by the factor of amplification referred to above. After the tracing styli have passed over the object, the adjustable stop 140 on the tracing carriage contacts the microswitch 139 which opens the holding circuit of relay 202. This de-energizes the driving motor 413, stopping the recorder paper and the tracing carriage, and, since the synchronous motor system is de-energized, carriage 115 may be reset to its starting position by means of crank 123. Any other section may then be traced using the above procedure. If electrical means is used to register the contours on the recording paper, relay 202 may be provided with an additional contact to permit the application of an electrical potential between the recorder points and plate 408.

Whereas the recorder and tracing unit may be of light weight construction for a great many applications of the invention, it is conceivable that for some purposes, namely where relatively large objects are to be inspected, a much heavier tracing unit would be necessary. The question then arises whether or not the stylus carriage synchronous motor 124 would deliver sufficient torque to overcome the inertial and frictional resistance of such a system. Large synchronous motors and generators are available, or a means for providing power amplification, as is shown in Fig. 15 may be used. Here, the impulses from synchronous generator 420 of the recording unit are fed to the stator S of a synchronous control transformer 141. The carriage 115 of the tracing unit is in this case operated by a D. C. motor 142 instead of a synchronous motor 124 which is replaced by the D. C. motor. Rotor R of the synchronous control transformer is geared to the D. C. motor so that the position of the D. C. motor armature may be compared, in an electrical sense, to the position of the armature of synchronous generator 420. A voltage is produced in rotor R of synchronous control transformer 141 which is proportional to the difference in the angular positions of the two armatures, that is, the voltage is proportional to the error in the position of the armature of the D. C. motor. This error voltage is the output of the synchronous control transformer 141 and is fed into a conventional vacuum tube control amplifier 205 which delivers impulses to the field coils of a D. C. generator 206, operated by A. C. motor 207. The A. C. motor is driven from the same power source as that which is fed to synchronous generator 420. Output from the D. C. generator 206 drives D. C. motor 142, the field of which is supplied with a D. C. source of power by field supply rectifier 208. Switch 209 may correspond to contacts 203 and 204 of the starting relay shown in Fig. 14 to permit resetting of the carriage after each trace.

When the rotor of synchronous generator 420 is moved from a state of rest through some small angle, a new direction of field is induced in the stator of synchronous control transformer 141. The rotor winding of the control transformer, which has been in a state of zero induced voltage, will now develop a voltage due to the new direction of field of the stator. This voltage, increased by the amplifier 205 and fed to the field coils of D. C. generator 206, will cause the D. C. motor to rotate. Because the rotor of the control transformer is geared to the D. C. motor, it must rotate in step with that motor. Furthermore, this roation is in a direcion which will bring the rotor of the control transformer back to a position of zero induced voltage, and the D. C. motor will stop when it has moved through the angle equal to that through which the synchronous generator 420 has moved.

Power amplification of the impulses resulting from any other motions of the contour inspection device may be achieved in a similar manner, using a separate control transformer, amplifier, D. C. motor and motor-generator set for each motion.

The synchronous electric generators and motors of the present invention as referred to throughout the specification and in the appended claims are of the self-synchronous type commonly called "selsyns."

It is perhaps apparent, but nevertheless significant, that the practice of the present invention, using either the optical comparator or the recorder embodiments, will permit the inspection and measurement of the pitch or angular relationships of an object in addition to its cross-sectional contours. By observing the degree of slant from a norm for any particular cross-section, its pitch and the pitch of the object at that plane of inspection may readily be determined.

Although the embodiments of the invention specifically illustrated herein relate to a device using two styli, for some purposes where information regarding but one surface is desired, only one tracing stylus and one repeating stylus or recording arm would be necessary. On the other hand, more than two styli may be advantageously used to obtain simultaneous inspection at any desired number of planes within practical limits by modifications which become apparent to those skilled in the art, they being familiar with the present invention.

It is also to be noted that the invention may be practiced by using one or more styli which are fixed in two coordinates, but movable in accordance with the contours of the object under inspection, and moving the object in relation to the styli by means similar to that employed for moving the styli as set forth above. Then, the relative motion between the styli and the moving object may be resolved along two coordinates, and by synchronous electric means stransmitted to exhibiting means to be observed as previously disclosed.

The invention is particularly advantageous where the large scale routine inspection of complex curved objects is desired. It provides a fast, efficient, and accurate inspection device which may be operated by an unskilled person, in contrast to common devices of the same character which are slow and require the extensive training of skilled personnel before such persons are qualified to operate them. However, once a person familiar with the present invention has set up the inspection device and outlined a simple test procedure, any intelligent unskilled person can inspect even the most complex objects. Furthermore, by simply changing the electrical connections between the tracing and exhibiting means from one exhibiting means to another, which may be accomplished by an elementary switching mechanism, the device becomes adapted to produce a permanent record of the inspection results. Such a record is often desirable for research work on objects of the character described to compare their contours before and after operational tests are performed thereon.

Many changes and modifications may be made in the physical construction and in the electrical systems of the invention without departing from its spirit, and it is understood that the invention is not to be limited in its broadest aspect to such details or exemplifications as have been used to describe and illustrate it. The invention may be variously practiced and embodied within the scope of the claims hereinafter made.

What I claim is:

1. A device for inspecting the contours of an object comprising a base, a surface engaging member thereon movably mounted to respond to contour variations of an inspection object, means for effecting engagement and relative movement between said surface engaging member and the object in a series of predetermined parallel planes of inspection, a carriage electrically synchronized with said means in response to said relative movement in each plane of inspection through a two member selsyn system electrically connected therebetween, said means being connected to one member and said carriage to the other, presetting means to fix the relative positions of said surface engaging member and said object progressively in each of said planes of inspection, a contour follower on said carriage movably mounted in synchronization with said surface engaging member in accordance with contour variations through a two member Selsyn system electrically connected therebetween, said surface engaging member being connected to one member and said follower to the other, a differential generator operatively controlled by said presetting means and electrically connected to said Selsyn system synchronizing said surface engaging member and said follower to move said follower a predetermined distance when the relative positions of said surface engaging member and said object are changed from one plane of inspection to another.

2. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second movable carriage electrically synchronized with said first movable carriage through a two member Selsyn system electrically connected therebetween, said first carriage being connected to one member and said second carriage to the other, a follower on said second carriage movably mounted in synchronization with said surface engaging member in accordance with contour variations through a two member selsyn system electrically connected therebetween, said surface engaging member being connected to one member and said follower to the other, and a differential generator operatively controlled by the movement of said frame and electrically connected to said selsyn system synchronizing said surface engaging member and said follower to move said follower a predetermined distance when said frame and surface engaging member are moved from one plane of inspection to another.

3. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second movable carriage electrically synchronized with said first movable carriage through a two member Selsyn system electrically connected therebetween, said first carriage being connected to one member and said second carriage to the other, a follower on said second carriage movably mounted in synchronization with said surface engaging member in accordance with contour variations through a two member selsyn system electrically connected therebetween, said surface engaging member being connected to one member and said follower to the other, a source of light to provide a light beam impinging on said follower and an optical system for projecting the image of said follower onto a comparator screen, said second movable carriage coacting with said follower means to exhibit the contour path of said follower on said comparator screen when a section of said object undergoes inspection, and a differential generator operatively controlled by the movement of said frame and electrically connected to said selsyn system synchronizing said surface engaging member and said follower to move said follower a predetermined distance when said frame and surface engaging member are moved from one plane of inspection to another.

4. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second base and a second movable carriage thereon electrically synchronized with said first movable carriage through a two member selsyn system electrically connected therebetween, said first carriage being connected to one member and said second carriage to the other, a follower on said second carriage movably mounted in synchronization with said surface engaging member in accordance with contour variations through a synchronous generator-motor selsyn system electrically connected therebetween, said surface engaging member being connected to said generator and said follower to said motor, and a differential generator operatively controlled by the movement of said frame and electrically connected to said selsyn system synchronizing said surface engaging member and said follower to move said follower a predetermined distance when said frame and surface engaging member are moved from one plane of inspection to another.

5. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second base and a second movable carriage thereon electrically snchronized with said first movable carriage through a synchronous generator-motor selsyn system electrically connected therebetween, said first carriage having a driving connection with said generator and said second carriage having a driven connection with said motor, a follower on said second carriage movably mounted in synchronization with said surface engaging member in accordance with contour variations through a second synchronous generator-motor selsyn system electrically connected therebetween, said surface engaging member having a driving connection with said generator and said follower having a driven connection with said motor, and a differential generator operatively controlled by the movement of said frame and electrically connected to said second selsyn system to move said follower a predetermined distance when said frame and surface engaging member are moved from one plane of inspection to another.

6. A device for inspecting the contours of an object comprising a base, a frame movably mounted thereon in a defined path and means to fix said frame in any predetermined position with respect thereto, a carriage movably mounted on said frame for motion in a path angularly displaced 90 degrees from the path of said frame, a first synchronous generator having a driven connection with said carriage, a second synchronous generator on said carriage, a surface engaging member having a driving connection with said second synchronous generator and movably mounted to respond to contour variations of an inspection object, a second base and a second movable carriage thereon electrically synchronized with said first movable carriage through a synchronous motor having a driving connection therewith and an electrical connection with said first synchronous generator, a second synchronous motor on said carriage, a follower having a driven connection with said second synchronous motor and movably mounted in synchronization with said surface engaging member in accordance with contour variations through an electrical connection between said second synchronous generator and said second synchronous motor, and a differential generator within said first base and frame, said differential generator having a driven connection with said frame and an electrical connection with said second synchronous generator and said second synchronous motor to move said follower a predetermined distance when said frame and surface engaging member are moved from one plane of inspection to another.

7. A device for inspecting the contours of an object comprising a base; a frame movably mounted thereon in a defined path and characterized by lower and upper guides spaced apart by an upstanding member; means to fix said frame in any predetermined position with respect to said base; a carriage movably mounted on said frame for motion in a path angularly displaced 90 degrees from the path of said frame, said carriage being characterized by lower and upper guided members spaced apart by an upstanding member; a first synchronous generator having a driven connection with said carriage; a second and a third synchronous generator on said lower and upper guided members respectively; a pair of opposed surface engaging members, each having a driving connection with one of said second and third synchronous generators and each being movably mounted to respond to contour variations of a side of an inspection object; a second base also characterized by lower and upper guides spaced apart by an upstanding member; a second movable carriage thereon electrically synchronized with said first movable carriage through a synchronous motor having a driving connection therewith and an electrical connection with said first synchronous generator, said second carriage also being characterized by lower and upper guided members spaced apart by an upstanding member; a second and a third synchronous motor respectively on said lower and upper guided members of said second carriage; a pair of opposed followers, each having a driven connection with one of said second and third synchronous motors, and each being movably mounted in synchronization with said surface engaging member in accordance with contour variations through an electrical connection between said second synchronous generator and said second synchronous motor and between said third synchronous generator and said third synchronous motor; and a pair of differential generators within said first base and frame and having a driven connection with said frame, each differential generator further having an electrical connection with one of said second and third synchronous generators and motors to move said followers a predetermined unidirectional distance when said frame and surface engaging members are moved from one plane of inspection to another.

8. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a pair of opposed surface engaging members on said carriage, each being movably mounted to respond to contour variations of a side of an inspection object, a second base and a second movable carriage thereon electrically synchronized with said first movable carriage through a two member selsyn system electrically connected therebetween, said first carriage being connected to one member and said second carriage to the other, a pair of opposed followers on said second carriage, each being movably mounted in synchronization with a corresponding surface engaging member in accordance with contour variations through separate synchronous generator-motor selsyn systems electrically connected therebetween, each surface engaging member being connected to a generator and each follower to a motor, and a pair of differential generators operatively controlled by the movement of said frame, each electrically connected to a selsyn system synchronizing a surface engaging member and a follower to move both of said followers a predetermined unidirectional distance when said frame and surface engaging members are moved from one plane of inspection to another.

9. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second base and a second movable carriage thereon electrically synchronized with said first movable carriage through a two member selsyn system electrically connected therebetween, said first carriage being connected to one member and said second carriage to the other, a follower on said second carriage movably mounted in synchronization with said surface engaging member in accordance with contour variations through a synchronous generator-motor selsyn system electrically connected therebetween, said surface engaging member being connected to said generator and said follower to said motor, a source of light to provide a light beam impinging on said follower and an optical system for projecting the image of said follower onto a comparator screen, and a differential generator operatively controlled by the movement of said frame and electrically connected to said selsyn system synchronizing said surface engaging member and said follower to move said follower a predetermined distance when said frame and surface engaging member are moved from one plane of inspection to another.

10. A device for inspecting the contours of an object comprising a base, a frame movably mounted thereon in a defined path and means to fix said frame in any predetermined position with respect thereto, a carriage movably mounted on said frame for motion in a path angularly displaced from the path of said frame, a surface engaging member on said carriage movably mounted to respond to contour variations of an inspection object, a second base and a second movable carriage thereon electrically synchronized with said first movable carriage through a synchronous generator-motor selsyn system electrically connected therebetween, said first carriage having a driving connection with said generator and said second carriage having a driven connection with said motor, a follower on said second carriage movably mounted in synchronization with said surface engaging member in accordance with contour variations through a second synchronous generator-motor selsyn system electrically connected therebetween, said surface engaging member having a driving connection with said generator and said follower having a driven connection with said motor, a source of light to provide a light beam impinging on said follower and an optical system to project the image of said follower onto a comparator screen, and a differential generator operatively controlled by the movement of said frame and electrically connected to said second selsyn system to move said follower a predetermined distance when said frame and surface engaging member are moved from one plane of inspection to another.

11. A device for inspecting the contours of an object comprising a base, a frame movably mounted thereon in a defined path and means to fix said frame in any predetermined position with respect thereto, a carriage movably mounted on said frame for motion in a path angularly displaced 90 degrees from the path of said frame, a first synchronous generator having a driven connection with said carriage, a second synchronous generator on said carriage, a surface engaging member having a driving connection with said second synchronous generator and movably mounted to respond to contour variations of an inspection object, a second base and a second movable carriage thereon electrically synchronized with said first movable carriage through a synchronous motor having a driving connection therewith and an electrical connection with said first synchronous generator, a second synchronous motor on said carriage, a follower having a driven connection with said second synchronous motor and movably mounted in synchronization with said surface engaging member in accordance with contour variations through an electrical connection between said second synchronous generator and said second synchronous motor, a source of light to provide a light beam impinging on said follower and an optical system for projecting the image of said follower onto a comparator screen, and a differential generator within said first base and frame, said differential generator having a driven connection with said frame and an electrical connection with said second synchronous generator and said second synchronous motor to move said follower a predetermined distance when said frame and surface engaging member are moved from one plane of inspection to another.

12. A gauging mechanism for use in an electrically synchronized contour inspection device comprising a base, a frame movably mounted thereon in a defined path and means to fix said frame in any predetermined position with respect thereto, a carriage movably mounted on said frame for motion in a path angularly displaced 90 degrees from the path of said frame, a first synchronous generator having a driven connection with said carriage, a second synchronous generator on said carriage, a surface engaging member having a driving connection with said second synchronous generator and movably mounted to respond to contour variations of an inspection object, and a differential generator within said base and frame, said differential generator having a driven connection with said frame and being adapted for an electrical connection with said second synchronous generator to impart to the impulses from said second synchronous generator a further impulse whenever said frame and surface engaging member are moved from one plane of inspection to another.

13. A gauging mechanism for use in an electrically synchronized contour inspection device comprising a base; a frame movably mounted thereon in a defined path and characterized by lower and upper guides spaced apart by an upstanding member; means to fix said frame in any predetermined position with respect to said base; a carriage movably mounted on said frame for motion in a path angularly displaced 90 degrees from the path of said frame, said carriage being characterized by lower and upper guided members spaced apart by an upstanding member; a first synchronous generator having a driven connection with said carriage; a second and a third synchronous generator on said lower and upper guided members respectively; a pair of opposed surface engaging members, each having a driving connection with one of said second and third synchronous generators and each being movably mounted to respond to contour variations of an inspection object; and a pair of differential generators within said base and frame, each differential generator having a driven connection with said frame and each being adapted for electrical connection with one of said second and third synchronous generators respectively to impart to the impulses from said second and third synchronous generators a further impulse whenever said frame and surface engaging members are moved from one plane of inspection to another.

JOHN HAZEN OSGOOD.

References Cited in the file of this patent

UNITED STATES PATENTS

| Number | Name | Date |
|---|---|---|
| 1,424,556 | Cooke | Aug. 1, 1922 |
| 1,612,120 | Hildebrand | Dec. 28, 1926 |
| 1,967,080 | Dietze | July 17, 1934 |
| 2,091,534 | Templin | Aug. 31, 1937 |
| 2,136,134 | Holley | Nov. 8, 1938 |
| 2,143,233 | Wallace | Jan. 10, 1939 |
| 2,239,811 | Cuppers | Apr. 29, 1941 |
| 2,302,572 | Reason | Nov. 17, 1942 |
| 2,305,167 | Kasper | Dec. 15, 1942 |
| 2,357,790 | Turchan | Sept. 5, 1944 |
| 2,398,562 | Russell | Apr. 16, 1946 |
| 2,417,062 | Cooke | Mar. 11, 1947 |
| 2,424,031 | Heer | July 15, 1947 |
| 2,433,585 | Warner | Dec. 30, 1947 |
| 2,437,639 | Floyd | Mar. 9, 1948 |
| 2,451,155 | DeBoer | Oct. 12, 1948 |
| 2,476,312 | Luety | July 19, 1949 |
| 2,494,663 | Lobosco | Jan. 17, 1950 |

FOREIGN PATENTS

| Number | Country | Date |
|---|---|---|
| 586,071 | England | Mar. 6, 1947 |